(12) United States Patent
Kim et al.

(10) Patent No.: US 9,523,309 B2
(45) Date of Patent: Dec. 20, 2016

(54) CONTROL METHOD OF TURBOCHARGER

(71) Applicant: Hyundai Motor Company, Seoul (KR)

(72) Inventors: Yoonjoo Kim, Yongin-si (KR); Joowon Lee, Gwangju-si (KR); Hyunjun Lim, Incheon (KR); Nahmroh Joo, Yongin-si (KR); Donghee Han, Seoul (KR); Iljoong Hwang, Yongin-si (KR); Jongil Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/534,586

(22) Filed: Nov. 6, 2014

(65) Prior Publication Data

US 2015/0167593 A1   Jun. 18, 2015

(30) Foreign Application Priority Data

Dec. 12, 2013   (KR) .................. 10-2013-0154968

(51) Int. Cl.

| F02B 37/12 | (2006.01) |
|---|---|
| F02B 37/16 | (2006.01) |
| F02B 37/18 | (2006.01) |
| F02D 23/00 | (2006.01) |
| F02D 41/00 | (2006.01) |

(52) U.S. Cl.
CPC ............ *F02B 37/127* (2013.01); *F02B 37/16* (2013.01); *F02B 37/18* (2013.01); *F02D 23/00* (2013.01); *F02D 41/0007* (2013.01); *F02D 2200/1002* (2013.01); *F02D 2200/602* (2013.01); *Y02T 10/144* (2013.01)

(58) Field of Classification Search
CPC ....... F02B 37/18; F02B 37/183; F02B 37/186; F02B 37/127; F02B 37/16; F02B 37/162
See application file for complete search history.

(56) References Cited

U.S. PATENT DOCUMENTS

| 4,774,812 A | * | 10/1988 | Hitomi | .................. | F02B 33/446 |
|---|---|---|---|---|---|
| | | | | | 60/601 |
| 4,870,822 A | * | 10/1989 | Kamimaru | ............ | F02B 37/186 |
| | | | | | 123/564 |
| 6,055,811 A | * | 5/2000 | Maddock | ................ | F02B 37/18 |
| | | | | | 60/600 |

(Continued)

FOREIGN PATENT DOCUMENTS

| JP | 2006-348758 A | 12/2006 |
|---|---|---|
| JP | 2009-068450 A | 4/2009 |
| JP | 2012-154292 A | 8/2012 |

*Primary Examiner* — Thomas Denion
*Assistant Examiner* — Jessica Kebea
(74) *Attorney, Agent, or Firm* — Morgan, Lewis & Bockius LLP

(57) ABSTRACT

A control method for a turbocharger system may include a first intake line supplying outdoor air to an intake manifold, a turbocharger, a second intake line supplying fresh air to the compressor; a third intake line connecting the compressor and the first intake line; a throttle valve controlling a flow of air supplied from the first intake line and the third intake line; an intake bypass valve controlling a flow of air that flows in the first intake line; a first exhaust line; a second exhaust line; an exhaust bypass valve controlling a flow of the exhaust gas discharged from the first exhaust line; and a controller controlling opening levels of the intake bypass valve, the exhaust bypass valve, and the throttle valve according to a driving condition of a vehicle.

12 Claims, 3 Drawing Sheets

(56) References Cited

U.S. PATENT DOCUMENTS

| | | | | |
|---|---|---|---|---|
| 6,516,757 B2 * | 2/2003 | Aoyama | ............... | F02B 75/048 |
| | | | | 123/78 R |
| 6,978,768 B2 * | 12/2005 | Yamashita | .............. | F02D 41/10 |
| | | | | 123/491 |
| 7,607,416 B2 * | 10/2009 | Sato | .................... | F02D 13/0234 |
| | | | | 123/406.24 |
| 2015/0122234 A1 * | 5/2015 | Tanaka | .................... | F02B 37/18 |
| | | | | 123/564 |
| 2015/0152777 A1 * | 6/2015 | Kim | ........................ | F02B 37/18 |
| | | | | 60/602 |

* cited by examiner

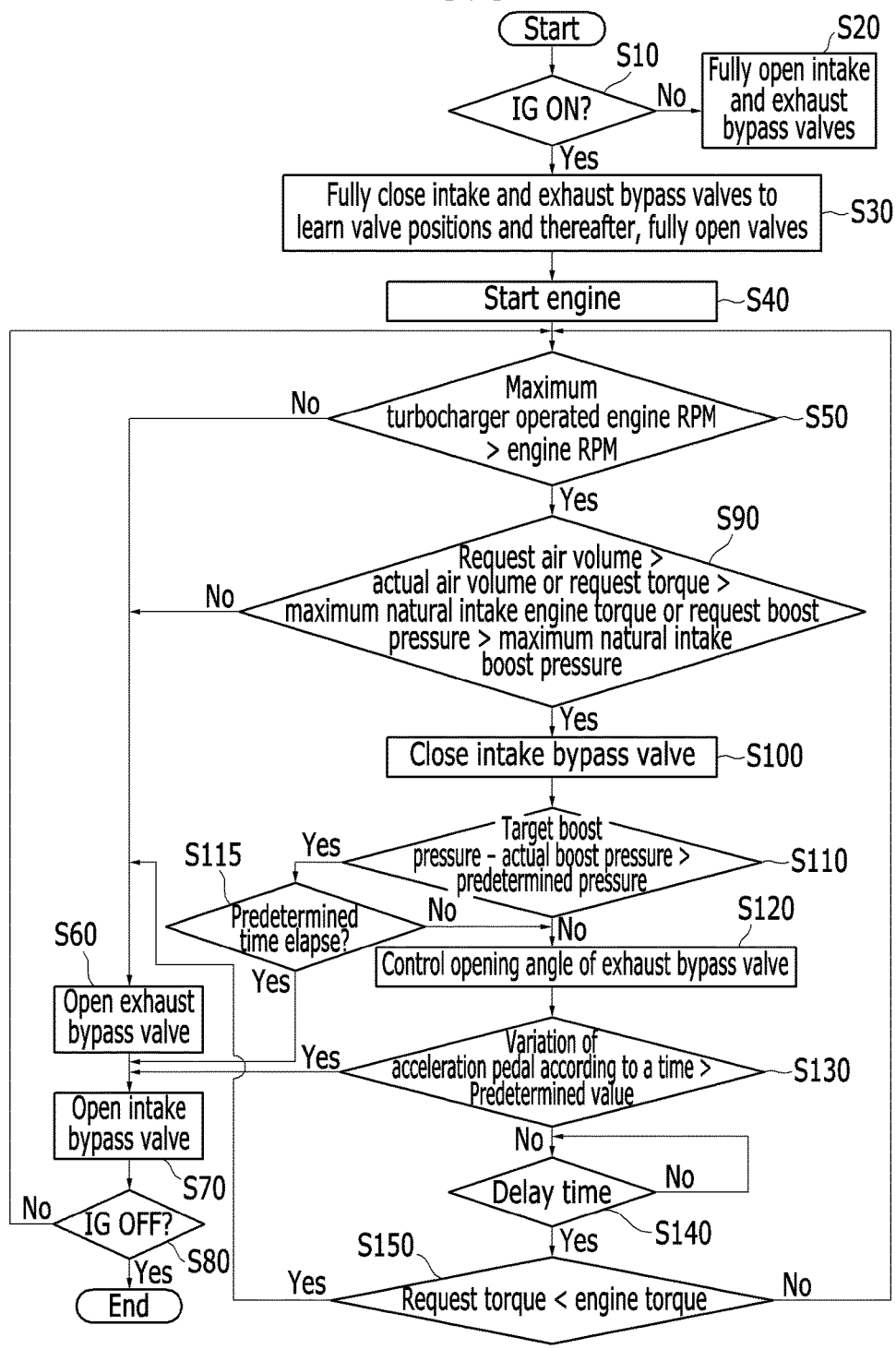

CONTROL METHOD OF TURBOCHARGER

CROSS-REFERENCE TO RELATED APPLICATION

The present application claims priority to and the benefit of Korean Patent Application No. 10-2013-0154968 filed on Dec. 12, 2013, the entire contents of which is incorporated herein for all purposes by this reference.

BACKGROUND OF THE INVENTION

Field of the Invention

The present invention relates to a control method of a turbocharger. More particularly, the present invention relates to a control method of a turbocharger that prevents damage to an engine from excessive boost pressure and surging impact from boost pressure remaining in an intake line.

Description of Related Art

In a conventional internal combustion engine, negative pressure generated during an intake stroke induces a mixture of air into a cylinder. This is called natural aspiration or normal aspiration.

However, a valve opened time is too short to sufficiently take in the air mixture, so forcible pumping is used for enhancing the volume effect of a cylinder, effective pressure ratio, and explosion pressure, thereby improving output. This is called turbocharging.

Since air that is turbocharged by a turbocharger is very hot, its density decreases, so the air discharged from the turbocharger is cooled by a kind of radiator called an intercooler to be supplied to the engine.

Meanwhile, research on simultaneously increasing output torque while decreasing fuel consumption in an interval in which the rpm of the engine is medium/low in an engine with the turbocharger is in progress, and research on more efficiently controlling the supply of recirculated gas is also progressing therewith.

An engine output is improved by 30 to 50% through installation of the turbocharger, but a temporal delay occurs until a turbocharging effect is shown due to an increase in rpm caused by pressing an accelerator.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control method for a turbocharger that prevents damage to an engine according to excessive boost pressure generated from abnormal operation.

Further, various aspects of the present invention are directed to providing a control method for a turbocharger that prevents surging impact caused by a boost pressure remaining in an intake line.

A control method for a turbocharger system according to an exemplary embodiment of the present invention may include: a first intake line supplying outdoor air to an intake manifold of an engine; a turbocharger including a turbine and a compressor; a second intake line supplying fresh air to the compressor; a third intake line connecting the compressor and the first intake line; a throttle valve installed to control a flow of air supplied from the first intake line and the third intake line; an intake bypass valve installed to control a flow of air that flows in the first intake line; a first exhaust line exhausting an exhaust gas of an exhaust manifold; a second exhaust line provided to make some of the exhaust gas discharged from the exhaust manifold join the first exhaust line through the turbine; an exhaust bypass valve installed to control a flow of the exhaust gas discharged from the first exhaust line; and a controller controlling opening levels of the intake bypass valve, the exhaust bypass valve, and the throttle valve according to a driving condition of a vehicle. The controller executes a series of commands including: judging whether rpm of the engine satisfies a set low/medium speed condition; judging whether an acceleration request condition is satisfied when the engine rpm satisfies the set low/medium speed condition; closing the intake bypass valve; judging whether a difference between a target boost pressure and a real boost pressure is greater than a predetermined differential pressure; and controlling an opening angle of the exhaust bypass valve according to the acceleration request condition when the difference between the target boost pressure and the real boost pressure is greater than the predetermined differential pressure.

The controller may judge whether a predetermined time elapses when the difference between the target boost pressure and the real boost pressure is greater than the predetermined differential pressure.

The controller may control the intake bypass valve to be opened when the predetermined time elapses.

The controller may control the opening angle of the exhaust bypass valve according to the acceleration request condition when the predetermined time elapses.

The controller may judge whether a surge generating condition of the second intake line is satisfied after the controlling the opening angle of the exhaust bypass valve according to the acceleration request condition, wherein the controller may control the intake bypass valve to be opened when the surge generating condition is satisfied.

The controller may judge whether a current request torque is smaller than an engine torque when the surge generating condition is not satisfied, and control the exhaust bypass valve and the intake bypass valve to be opened when the current request torque is smaller than the engine torque.

The surge generating condition may be satisfied when a variation of an accelerator pedal according to a time is greater than a predetermined value.

The controller may judge whether the request torque is smaller than the engine torque within a set time which is delayed after controlling the opening angle of the exhaust bypass valve.

If controller judges that the engine rpm does not satisfy the low/medium speed condition, the controller may control the exhaust bypass valve and the intake bypass valve to be opened.

The low/medium speed condition may be satisfied when a current engine rpm is smaller than a maximum turbocharger operated engine rpm.

It may be judged whether the acceleration request condition is satisfied from a vehicle operating condition including a requested air volume, requested torque, and requested boot pressure.

The requested air volume may be an air volume requested by the engine, which is determined from the current accelerator opening angle, and when the determined requested air volume is larger than an actual air volume currently supplied to the engine, the acceleration request condition may be satisfied.

The request torque may be request torque determined from the current accelerator opening angle, and when the determined request torque is larger than the set maximum natural intake engine torque of the engine, the acceleration request condition is satisfied.

The request boost pressure may be request boost pressure determined from the current accelerator opening angle, and when the determined request torque is larger than the set maximum natural intake boost pressure of the engine, the acceleration request condition is satisfied.

The opening angle of the exhaust bypass valve may be determined based on the vehicle operating condition including the request air volume, the request torque, and the request boost pressure.

According to an exemplary embodiment of the present invention, damage to an engine by excessive boost pressure can be prevented.

Further, generation of surging impact by a boost pressure remaining in an intake line can be prevented.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a flowchart of the control method for a turbocharger according to an exemplary embodiment of the present invention.

Figure 1:
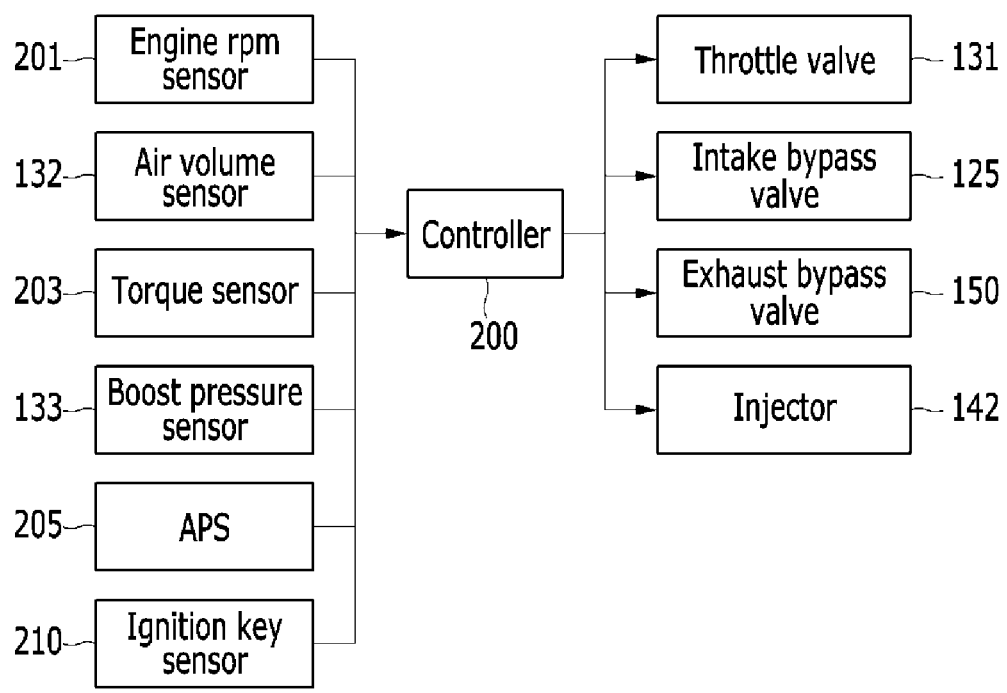
FIG. 1 is a block diagram of a turbocharger system to which a control method for a turbocharger is applied according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In describing the present invention, parts that are not related to the description will be omitted. Like reference numerals generally designate like elements throughout the specification.

In addition, the magnitude and thickness of each configuration shown in the drawings are arbitrarily shown for better understanding and ease of description, but the present invention is not limited thereto. In the drawings, the thickness of layers, films, panels, regions, etc., are exaggerated for clarity.

Hereinafter, an exemplary embodiment of the present invention will be described in detail with reference to the accompanying drawings.

Figure 2:
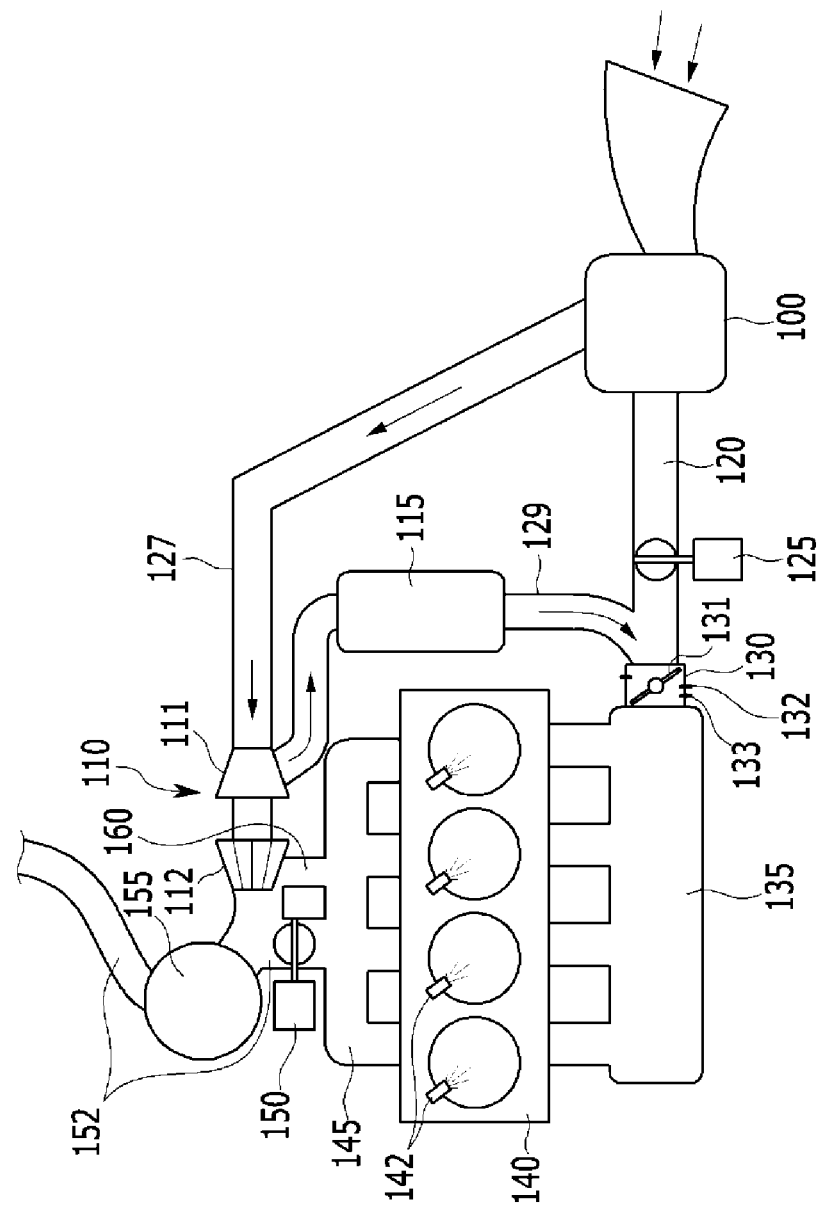
FIG. 2 is a configuration diagram of a turbocharger system to which the control method for a turbocharger is applied according to the exemplary embodiment of the present invention.

FIG. 1 is a block diagram of a turbocharger system to which a control method for a turbocharger is applied according to an exemplary embodiment of the present invention, and FIG. 2 is a configuration diagram of a turbocharger system to which the control method for a turbocharger is applied according to the exemplary embodiment of the present invention.

Referring to FIGS. 1 and 2, the turbocharger system to which the control method for a turbocharger is applied according to the exemplary embodiment of the present invention includes a first intake line 120 supplying outdoor air to an intake manifold 135 of an engine 140, a turbocharger 110 including a turbine 112 and a compressor 111, a second intake line 127 supplying fresh air to the compressor 111, a third intake line 129 connecting the compressor 111 and the first intake line 120, a throttle valve 131 installed to control a flow of air supplied from the first intake line 120 and the third intake line 129, an intake bypass valve 125 installed to control a flow of air that flows in the first intake line 125, a first exhaust line 152 configured to discharge exhaust gas of an exhaust manifold 145, a second exhaust line 160 provided to make some of the exhaust gas discharged from the exhaust manifold 145 join the first exhaust line 152 through the turbine 112, an exhaust bypass valve 150 installed to control a flow of the exhaust gas discharged from the first exhaust line 152, and a controller 200 controlling opening levels of the intake bypass valve 125, the exhaust bypass valve 150, and the throttle valve 131 according to a driving condition of a vehicle.

Herein, air that flows into the first intake line 120 and the second intake line 127 is purified through an air-cleaner box 100, and an intercooler 115 may be provided in the third intake line 129 to cool air that passes through the compressor 111.

The throttle valve 131 may be provided in a throttle body 130

An air volume sensor 132 and a boost pressure sensor 133 are provided in the throttle body to apply respectively measured corresponding signals to the controller 200.

A postprocessor including a catalyst 155 is provided in the first exhaust line 152 to reduce harmful components of the exhaust gas.

An engine rpm sensor 201 is provided in the engine 140 to detect an engine rpm and apply the corresponding signal to the controller 200. The air volume sensor 132 measures an air volume that flows into the intake manifold 135 to apply the corresponding signal to the controller 200. A torque sensor 203 measures torque of the engine 140 to apply the corresponding signal to the controller 200. The boost pressure sensor 133 detects boost pressure to apply the corresponding signal to the controller 200. An accelerator opening level sensor 205 is provided in an acceleration pedal to detect an opening angle of the acceleration pedal and apply the corresponding signal to the controller 200.

The controller 200 receives signals of the respective sensors to control respective opening angles of the throttle valve 131, the intake bypass valve 125, and the exhaust bypass valve 150, and controls an operation of an injector 142 provided in the engine.

The controller 200 may be implemented with one or more microprocessors operated by a predetermined program or hardware including the microprocessor, and the predetermined program includes a series of commands for performing the control method for the turbocharger according to an exemplary embodiment of the present invention to be described.

FIG. 3 is a flowchart of a control method for a turbocharger according to an exemplary embodiment of the present invention.

Hereinafter, the control method for a turbocharger according to the exemplary embodiment of the present invention will be described with reference to FIGS. 1 to 3.

The controller 200 receives a corresponding signal from an ignition key sensor 210 to judge whether the ignition key sensor 210 is on at step S10. When the ignition key 210 is not on, the controller 200 fully opens the intake and exhaust bypass valves 125 and 150 at S20. When the ignition key 210 is on, the controller 200 fully closes the intake and exhaust bypass valves 125 and 150 to learn valve positions, and thereafter, fully opens the valves again at step S30.

The controller 200 judges whether the rpm of the engine 140 satisfies a set low/medium speed condition at step S50, after the engine 140 is started. When the rpm of the engine 140 satisfies the low/medium speed condition, the controller 200 judges whether an acceleration request condition is satisfied at step S90. When the rpm of the engine 140 does not satisfy the low/medium condition, that is, under a high-speed driving condition, the controller 200 opens the exhaust bypass valve 150 and the intake bypass valve 125 at steps S60 and S70.

The low/medium speed condition may be satisfied when the current rpm of the engine 140 is lower than the maximum operated engine rpm of the turbocharger 110.

Herein, the maximum operated engine rpm of the turbocharger 110 may be arbitrarily determined through a test as an rpm that is equivalent to or less than the maximum natural engine torque, for example, approximately 45,000 rpm.

The turbocharger 110 is a small-sized turbocharger in which an air flow coefficient is equal to or less than 2 to maximize performance in a low speed area and efficiently use exhaust energy. The maximum operated engine rpm of the turbocharger 110 is a value determined through a test as an rpm that ensures efficient operation of the turbocharger 110.

That is, the control method for a turbocharger according to the exemplary embodiment of the present invention uses a small-sized turbocharger under the low/medium speed condition of approximately 45,000 rpm or less to extend an operating area, and allows the small-sized turbocharger to operate with the natural intake engine under a speed condition of 45,000 rpm or more, thereby minimizing exhaust resistance.

It may be judged whether the acceleration request condition is satisfied from a vehicle operating condition including requested air volume, requested torque, and requested boost pressure.

That is, the requested air volume is an air volume requested by the engine, and is calculated from the current accelerator opening angle. When the calculated requested air volume is higher than an actual air volume supplied to the engine 140 at present, the acceleration request condition may be satisfied.

The actual air volume is measured by the air volume sensor 132, and since calculation of the requested air volume is apparent to those skilled in the art, a detailed description thereof will be omitted.

The request torque is calculated from the current accelerator opening angle, and when the calculated request torque is higher than the set maximum natural intake engine torque of the engine, the acceleration request condition may be satisfied. The maximum natural intake engine torque is a value which is set through the test in advance. Further, since the request torque as a value calculated based on the accelerator opening angle measured by the accelerator opening level sensor 205 is apparent to those skilled in the art, a detailed description thereof will be omitted.

The request boost pressure is a request pressure calculated from the current accelerator opening angle, and when the calculated request boost pressure is larger than the set maximum natural intake boost pressure of the engine, the acceleration request condition may be satisfied. The maximum natural intake boost pressure is a value which is set through the test in advance.

When the controller 200 judges that the acceleration request condition is satisfied, the controller 200 controls the intake bypass valve 125 and the exhaust bypass valve 150 to be closed at step S100.

The controller 200 judges whether a difference between a target boost pressure and a real boost pressure is greater than a predetermined differential pressure at step S110.

When the difference between the target boost pressure and the real boost pressure is greater than the predetermined differential pressure, the controller 200 judges whether a predetermined time elapses at step S115. When the predetermined time elapses, the controller 200 controls the intake bypass valve 125 to be opened at step S70.

That is, when the predetermined elapses, the controller 200 judges over boosting due to the abnormality of the exhaust bypass valve 145. And the controller 200 controls the intake bypass valve 125 to be opened and exhausts turbocharged air to the air cleaner box 100, and thereby the engine 140 can be protected.

The controller 200 controls the opening angle of the exhaust bypass valve 150 according to the acceleration request condition when the predetermined time elapses at step S120. Herein, the control of the opening angle of the exhaust bypass valve 150 includes fully-closed control.

In the control of the opening angle of the exhaust bypass valve 150, the value determined by the test according to the acceleration request condition is input in advance to a map to be used.

That is, the opening angle of the exhaust bypass valve 150 may be determined based on the vehicle operating condition including the request air volume, the request torque, and the request boost pressure, and the opening angle of the exhaust bypass valve 150 is controlled by the map which is input in advance through the test.

The controller 200 judges whether a surge generating condition of the second intake line is satisfied after the controlling the opening angle of the exhaust bypass valve 150 at step S130. Herein, the surge generating condition may be satisfied when a variation of an accelerator pedal according to time is greater than a predetermined value.

When the surge generating condition is satisfied, the controller controls the intake bypass valve 125 to be opened at step S70.

That is, when the variation of the accelerator pedal is rapidly decreased to reduce vehicle speed after acceleration, high boost pressure may remain in the second intake line 127 at a rear end of the compressor 111. A movement of exhausting gas is instantaneously generated in the direction of the inlet of the compressor 111 by the high boost pressure and surge is generated due to the movement of exhausting gas, and thereby the compressor 111 may be damaged.

Accordingly, to prevent the surge, the controller 200 controls the intake bypass valve 125 to be opened.

In the related art, when an excessive boost pressure is generated in the second intake line 127, the excessive boost pressure is exhausted by using an additional valve such as recirculation valve. In this case, since the recirculation valve is operated by a negative pressure of the intake manifold 135, reaction speed is slow, and the recirculation valve is not normally operated when a problem with the negative pressure generated in the intake manifold 135 occurs.

However, as described above, when the high boost pressure is exhausted by using the intake bypass valve 125, the additional valve such as the recirculation valve does not need to be used. Further, the reaction speed is fast comparing to the related art, and since the negative pressure of the intake manifold 135 is not used, reliability is improved.

The controller 200 judges whether a current request torque is smaller than an engine torque at step S150 after judging whether the surge generating condition of the second intake line is satisfied. When the current request torque is smaller than the engine torque, the controller controls the exhaust bypass valve 150 and the intake bypass valve 125 to be opened at steps S60 and S70.

The controller 200 judges whether the request torque is smaller than the engine torque within a set time which is delayed after controlling the opening angle of the exhaust bypass valve at step S120 to prevent the valve from being frequently controlled.

In the control method for a turbocharger according to the exemplary embodiment of the present invention, not under the low/medium speed condition but under a high speed driving condition, both the exhaust bypass valve 150 and the intake bypass valve 125 are opened, and as a result, a natural intake rather than an intake through the turbocharger 110 is used and the engine 140 is operated. Accordingly, performance of a natural intake type in which the exhaust resistance is minimized may be just maintained under the high speed driving condition.

Further, in the control method for a turbocharger according to the exemplary embodiment of the present invention, the request torque of the engine may be satisfied by actively using the turbocharger 110 under the low/medium speed condition. In particular, the intake bypass valve 125 is closed and the opening angle of the exhaust bypass valve 150 is controlled or the exhaust bypass valve 150 is closed to actively take in air to the engine 140 by operating the turbocharger 110.

In addition, in the control method for a turbocharger according to the exemplary embodiment of the present invention, the exhaust bypass valve 150 and the intake bypass valve 125 are opened under the high speed condition to minimize the exhaust resistance.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A control method for a turbocharger system, comprising:
   a first intake line supplying outdoor air to an intake manifold of an engine;
   a turbocharger including a turbine and a compressor;
   a second intake line supplying fresh air to the compressor;
   a third intake line connecting the compressor and the first intake line;
   a throttle valve installed to control a flow of air supplied from the first intake line and the third intake line;
   an intake bypass valve installed to control a flow of air that flows in the first intake line;
   a first exhaust line exhausting an exhaust gas of an exhaust manifold;
   a second exhaust line provided to make a part of the exhaust gas discharged from the exhaust manifold join the first exhaust line through the turbine;
   an exhaust bypass valve installed to control a flow of the exhaust gas discharged from the first exhaust line;
   a controller controlling opening levels of the intake bypass valve, the exhaust bypass valve, and the throttle valve according to an operating condition of a vehicle,
   a boost pressure sensor providing an indication of real boost pressure to the controller;
   a rpm sensor providing an indication of engine rpm to the controller; and
   the controller including non-transitory executable instructions for:
   judging whether engine rpm of the engine satisfies a set low/medium speed condition;
   judging whether an acceleration request condition is satisfied when the engine rpm satisfies the set low/medium speed condition;
   closing the intake bypass valve;
   judging whether a difference between a target boost pressure and a real boost pressure is greater than a predetermined differential pressure;
   controlling an opening angle of the exhaust bypass valve according to the acceleration request condition when the difference between the target boost pressure and the real boost pressure is less than the predetermined differential pressure;
   judging whether a predetermined time elapses when the difference between the target boost pressure and the real boost pressure is greater than the predetermined differential pressure; and
   controlling the intake bypass valve to be opened when the predetermined time elapses.

2. The method of claim 1, wherein the controller further comprises non-transitory executable instructions for judging whether a surge generating condition of the second intake line is satisfied after the controlling the opening angle of the exhaust bypass valve according to the acceleration request condition; and controlling the intake bypass valve to be opened when the surge generating condition is satisfied.

3. The method of claim 2, wherein the controller comprises non-transitory executable instructions for judging whether a current request torque is smaller than an engine torque when the surge generating condition is not satisfied, and controlling the exhaust bypass valve and the intake bypass valve to be opened when the current request torque is smaller than the engine torque.

4. The method of claim 3, wherein the surge generating condition is satisfied when a variation of an accelerator pedal according to a time is greater than a predetermined value.

5. The method of claim 4, wherein the controller comprises non-transitory executable instructions for judging whether the current request torque is smaller than the engine torque within a set time which is delayed after controlling the opening angle of the exhaust bypass valve.

6. The method of claim 1, wherein the controller further comprises non-transitory executable instructions for opening the exhaust bypass valve and the intake bypass valve when the engine rpm does not satisfy the low/medium speed condition.

7. The method of claim 1, wherein the low/medium speed condition is satisfied when a current engine rpm is smaller than a maximum turbocharger operated engine rpm.

8. The method of claim 1, wherein it is judged whether the acceleration request condition is satisfied from a vehicle operating condition including a requested air volume, requested torque, and requested boost pressure.

9. The method of claim 8,
wherein the requested air volume is an air volume requested by the engine, which is determined from the current accelerator opening angle, and
when the determined requested air volume is larger than an actual air volume supplied to the engine at present, the acceleration request condition is satisfied.

10. The method of claim 8,
wherein the requested torque is requested torque determined from the current accelerator opening angle, and
when the determined requested torque is larger than the set maximum natural intake engine torque of the engine, the acceleration request condition is satisfied.

11. The method of claim 8,
wherein the requested boost pressure is requested boost pressure determined from the current accelerator opening angle, and
when the determined requested torque is larger than the set maximum natural intake boost pressure of the engine, the acceleration request condition is satisfied.

12. The method of claim 1, wherein the opening angle of the exhaust bypass valve is determined based on a operating condition of the vehicle including a requested air volume, a requested torque, and a requested boost pressure.

* * * * *